US011709232B2

(12) United States Patent
Wang

(10) Patent No.: US 11,709,232 B2
(45) Date of Patent: Jul. 25, 2023

(54) LASER SCANNING DEVICE AND LASER RADAR

(71) Applicant: Xiaobo Wang, Changsha (CN)

(72) Inventor: Xiaobo Wang, Changsha (CN)

( * ) Notice: Subject to any disclaimer, the term of this patent is extended or adjusted under 35 U.S.C. 154(b) by 799 days.

(21) Appl. No.: 16/620,517

(22) PCT Filed: Jun. 20, 2018

(86) PCT No.: PCT/CN2018/092051
§ 371 (c)(1),
(2) Date: Dec. 8, 2019

(87) PCT Pub. No.: WO2019/241941
PCT Pub. Date: Dec. 26, 2019

(65) Prior Publication Data
US 2021/0405160 A1 Dec. 30, 2021

(51) Int. Cl.
G01S 7/481 (2006.01)
G01S 17/48 (2006.01)

(52) U.S. Cl.
CPC ............ *G01S 7/4817* (2013.01); *G01S 17/48* (2013.01)

(58) Field of Classification Search
CPC ................................ G01S 7/4817; G01S 17/48
See application file for complete search history.

(56) References Cited

U.S. PATENT DOCUMENTS 4,891,653 A * 1/1990 Hamada .................. G01D 15/14
347/262
6,488,676 B1 12/2002 Glockler
7,002,669 B2 2/2006 Frick
7,312,854 B2 12/2007 Sugiyama
7,969,636 B2 6/2011 Naito
9,316,495 B2 4/2016 Suzuki
10,073,165 B2 9/2018 Nordenfelt et al.
(Continued)

FOREIGN PATENT DOCUMENTS

CN 1420749 A 5/2003
CN 1821711 A 8/2006
(Continued)

OTHER PUBLICATIONS

International Search Report in the international application No. PCT/CN2018/092051, dated Mar. 19, 2019.

*Primary Examiner* — Behrang Badii
*Assistant Examiner* — Jay Khandpur
(74) *Attorney, Agent, or Firm* — Syncoda LLC; Feng Ma

(57) ABSTRACT

An embodiment provides a laser scanning device, which includes a lens fixture, a lens and a light path regulation mechanism. The lens is arranged on the lens fixture, and one side of the lens faces incident light. The light path regulation mechanism is connected with the lens fixture and includes a distance regulation component and a rotation driving component, the distance regulation component is configured to regulate a position of the lens fixture, the distance regulation component regulates the position of the lens fixture to correspondingly regulate an eccentric distance of the lens relative to the incident light, the rotation driving component is configured to drive the lens to rotate around a set rotation axis that is parallel to an optical axis of the lens. Another embodiment discloses a laser radar.

16 Claims, 11 Drawing Sheets

(56) References Cited

U.S. PATENT DOCUMENTS

| | | | |
|---|---|---|---|
| 2001/0049880 A1* | 12/2001 | Shimizu | G01B 11/005 |
| | | | 33/551 |
| 2004/0050830 A1* | 3/2004 | Ohtomo | G01C 15/004 |
| | | | 219/121.75 |
| 2004/0222366 A1 | 11/2004 | Frick | |
| 2006/0187441 A1* | 8/2006 | Sugiyama | G01S 17/48 |
| | | | 356/3.01 |
| 2009/0080047 A1 | 3/2009 | Naito | |
| 2010/0022866 A1* | 1/2010 | Feke | A61B 6/4417 |
| | | | 600/407 |
| 2011/0134729 A1* | 6/2011 | Ishimoto | G11B 7/0953 |
| 2014/0071428 A1 | 3/2014 | Suzuki | |
| 2015/0070792 A1* | 3/2015 | Terajima | G02B 7/08 |
| | | | 359/824 |
| 2015/0241632 A1* | 8/2015 | Chann | G02B 6/4296 |
| | | | 385/27 |
| 2016/0126864 A1* | 5/2016 | Araki | G02B 7/09 |
| | | | 359/557 |
| 2016/0131745 A1 | 5/2016 | Nordenfelt et al. | |
| 2018/0164659 A1* | 6/2018 | Mak | G02B 27/646 |
| 2021/0141291 A1* | 5/2021 | Hirata | G02B 7/021 |

FOREIGN PATENT DOCUMENTS

| | | | | |
|---|---|---|---|---|
| CN | 101097290 | A | | 1/2008 |
| CN | 101393399 | A | | 3/2009 |
| CN | 103675831 | A | | 3/2014 |
| CN | 104166174 | A | | 11/2014 |
| CN | 105589075 | A | | 5/2016 |
| CN | 110118766 | A | * | 8/2019 |
| WO | WO-2019045152 | A1 | * | 3/2019 ............. G01B 11/24 |

* cited by examiner

LASER SCANNING DEVICE AND LASER RADAR

CROSS-REFERENCE TO RELATED APPLICATIONS

This application is a 35 U.S.C. 371 national stage filing of International Application No. PCT/CN2018/092051 filed 2018 Jun. 20, the entire contents of which are hereby incorporated in their entirety by reference.

TECHNICAL FIELD

The disclosure relates to the field of detection, and particularly to a laser scanning device and a laser radar.

BACKGROUND

Laser radar, i.e., optical radar and Light Detection and Ranging (LiDAR), is a sensor configured to accurately obtain three-dimensional position information. Its working principle is: emitting a detection laser beam to a target at first, then comparing a received signal reflected from the target and the emitted signal and performing proper processing to obtain related information of the target, for example, parameters such as a distance, an orientation, a height, a velocity, an attitude and a shape of the target. A laser radar obtains three-dimensional position information by measuring a time difference and phase difference of a laser signal to determine a distance, measuring an angle by horizontal rotational scanning or phased scanning, establishing a two-dimensional polar coordinate system according to the these two types of data and acquiring signals at different pitching angles to obtain height position of the third dimension. High-frequency laser radar may acquire information about a large number of (at the order of magnitude of $10^6$-$10^7$) position points (referred to as a "point cloud") within a second, and perform three-dimensional modeling according to the information.

In existing laser radars, a two-dimensional vibration mirror is usually adopted to change a direction of a light path of an emitted laser in a vertical direction and a horizontal direction to implement movement of a laser beam in a plane to obtain two-dimensional coordinate data, and a reflector is configured to change the direction of the light path of the emitted laser for incidence to a measured object and receive laser reflected by the measured object for incidence to an optical receiver. For completely scanning a surface of the measured object, the reflector is required to be arranged to be rotatable in the two directions, so a relatively large space is required, and the whole size of the laser radar is increased.

SUMMARY

Embodiments of the disclosure are intended to provide a laser scanning device and laser radar which are compact in structure and relatively small in size.

The technical solutions of the embodiments of the disclosure are implemented as follows.

A laser scanning device includes a lens fixture, a lens and a light path regulation mechanism. The lens is arranged on the lens fixture, and one side of the lens faces incident light. The light path regulation mechanism is connected with the lens fixture and includes a distance regulation component and a rotation driving component, the distance regulation component is configured to regulate a position of the lens fixture, the distance regulation component regulates the position of the lens fixture to correspondingly regulate an eccentric distance of the lens relative to the incident light, the rotation driving component is configured to drive the lens to rotate around a set rotation axis that is parallel to an optical axis of the lens.

According to an embodiment, the lens fixture may include a lens barrel and a pressure ring; an inner surface of the lens barrel is provided with a stepped surface for mounting the lens; and the lens is mounted on the stepped surface, and the pressure ring is pressed against the other side of the lens, which is far away from the stepped surface.

According to an embodiment, the distance regulation component may include a guide structure that includes guide rails located on two opposite sides of the lens fixture, guide slots for receiving the two opposite sides of the lens fixture are formed in the guide rails, and an extending direction of the guide slot is perpendicular to the rotation axis.

According to an embodiment, the distance regulation component may include an annular bracket and a spring; the spring includes a first end connected with the lens fixture and a second end connected with the annular bracket; and the annular bracket is connected with the rotation driving component.

According to an embodiment, the distance regulation component may further include a magnetic driving mechanism driving the spring to extend and retract, and the magnetic driving mechanism includes a first magnet and multiple second magnets; the spring further includes a third end connected with the first magnet and a fourth end connected with the lens fixture; and the multiple second magnets are arranged along a circumferential direction of the annular bracket.

According to an embodiment, the rotation driving component may include a bearing, the bearing includes an outer race and an inner race spaced from and concentric with the outer race, and the outer race is rotatable relative to the inner race; and the outer race is connected with the lens fixture, and the outer race rotates to drive the lens fixture and the lens to rotate around the set rotation axis together.

According to an embodiment, the rotation driving component may further include a gear driving structure connected with the outer race, and the gear driving structure includes a driven gear, a driving gear and a motor; and the driven gear is fixedly connected with the outer race, the driving gear is connected with the motor, the driving gear is meshed with the driven gear, and the motor drives the driving gear to rotate and drives the driven gear to rotate to further drive the lens fixture and the lens to rotate around the rotation axis together.

According to an embodiment, the rotation driving component may further include a drive belt driving structure, and the drive belt driving structure includes a drive belt, a driving pulley and a motor; and the drive belt is sleeved on the outer race and the driving pulley, and the motor drives the driving pulley to rotate to further drive the lens fixture and the lens to rotate around the rotation axis.

According to an embodiment, the scanning device may further include a fixed seat fixedly connected with the inner race, and the fixed seat is configured to fix the bearing.

A laser radar includes a laser, a photoelectric detector and a laser scanning device. The laser is arranged on one side of the laser scanning device, and is configured to emit a laser beam incident to a lens. The laser scanning device is configured to refract the laser beam, the refracted laser beam being emergent to a target. The photoelectric detector is configured to acquire a laser beam reflected by the target.

The embodiments of the disclosure have the following beneficial effects. The embodiments of the disclosure provide the laser scanning device including the lens fixture, the lens and the light path regulation mechanism. The lens is arranged on the lens fixture, and one side of the lens faces the incident light. The light path regulation mechanism is connected with the lens fixture and includes the distance regulation component and the rotation driving component, the distance regulation component is configured to regulate the position of the lens fixture, the distance regulation component regulates the position of the lens fixture to correspondingly regulate the eccentric distance of the lens relative to the incident light, the rotation driving component is configured to drive the lens to rotate around the set rotation axis that is parallel to the optical axis of the lens. With arrangement of the lens, the incident light incident to the lens is refracted. With arrangement of the distance regulation component, a distance between a center of the lens and an axis of the incident light is regulated, and the incident light is deflected to different extents by use of the fact that different parts between the center and outer periphery of the lens have different refraction angles for the incident light. With arrangement of the rotation driving component, the lens may rotate around the set rotation axis, and refracted light generated by the lens from the incident light may form an annular movement track on a two-dimensional plane. In this way, under the action of refracting the incident light to different extents at different parts between the center and outer periphery of the lens, movement of the refracted light generated by the lens from the incident light on the two-dimensional plane may be implemented only by single rotational movement of the lens, the whole structure is more compact, and the size of the laser scanning device is reduced.

DETAILED DESCRIPTION

The disclosure will further be described below in combination with the drawings and the embodiments in detail. It is to be understood that the embodiments described herein are only adopted to explain the disclosure and not intended to limit the disclosure.

Figure 1:
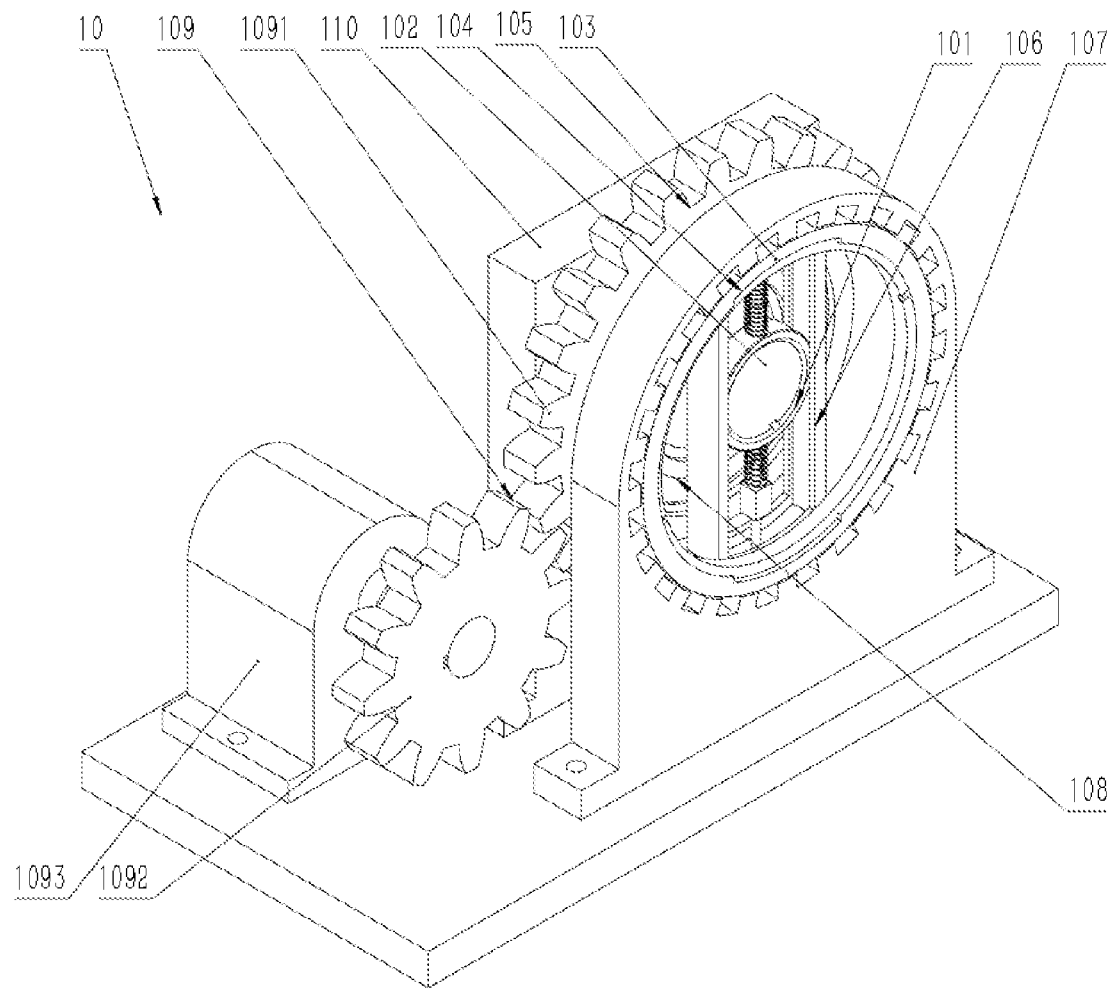
FIG. 1 is a composition structure diagram of a scanning device according to an optional embodiment of the disclosure.

Referring to FIG. 1, an embodiment of the disclosure provides a laser scanning device 10, which includes a lens fixture 101, a lens 102 and a light path regulation mechanism 103. The lens 102 is arranged on the lens fixture 101, and one side of the lens 102 faces incident light. The light path regulation mechanism 103 is connected with the lens fixture 101 and includes a distance regulation component 104 and a rotation driving component 105, the distance regulation component 104 is configured to regulate a position of the lens fixture 101, the distance regulation component 104 regulates the position of the lens fixture 101 to correspondingly regulate an eccentric distance of the lens 102 relative to the incident light, the rotation driving component 105 is configured to drive the lens 102 to rotate around a set rotation axis that is parallel to an optical axis of the lens 102.

Figure 2:
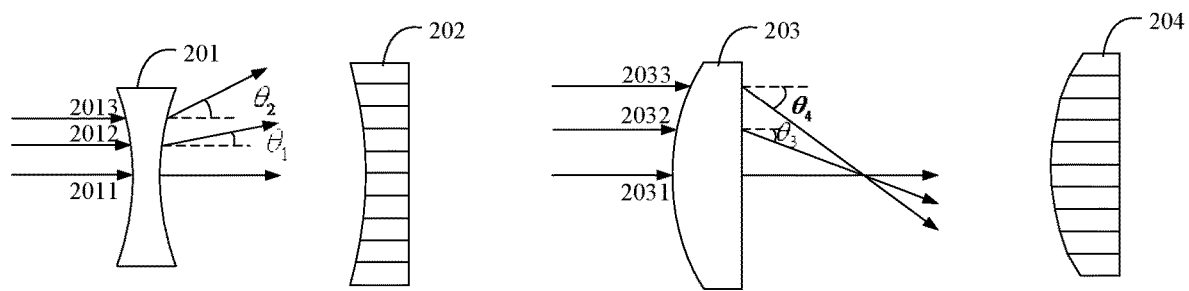
FIG. 2 is a structure diagram of a lens according to an optional embodiment of the disclosure.

Specifically, the laser scanning device 10 is configured to implement scanning of the incident light on a two-dimensional plane. Referring to FIG. 2, the lens 102 may be a concave lens or a convex lens, the concave lens may be a spherical concave lens 201, and the spherical concave lens 201 may be a biconcave lens of which double surfaces are concave surfaces, may be a plano-concave lens of which one surface is a concave surface and the other surface is a plane and may also be a convex-concave lens of which one surface is a convex surface and the other surface is a concave surface. Alternatively, the concave lens may also be an aspherical concave lens 202. The convex lens may be a spherical convex lens 203, and the spherical convex lens 203 may be a biconvex lens, may be a plano-convex lens of which one surface is a convex surface and the other surface is a plane and may also be a concave-convex lens of which one surface is a convex surface and the other surface is a concave surface. Alternatively, the convex lens may also be an aspherical convex lens 204.

Referring to FIG. 1 again, the lens fixture 101 is configured to clamp the lens 102, the light path regulation mechanism 102 is connected with the lens fixture 101, and the light path regulation mechanism 103 is configured to regulate a movement track of the incident light that passes through the lens 102 on the two-dimensional plane. Specifically, the light path regulation mechanism 103 includes the distance regulation component 104 and the rotation driving component 105, the distance regulation component 104 is configured to regulate the position of the lens fixture 101, and the distance regulation component 104 regulates the position of the lens fixture 101 to correspondingly regulate the eccentric distance of the lens 102 relative to the incident light. For example, the lens 102 is the spherical concave lens 201. Referring to FIG. 2 again, the incident light is transmitted through the spherical concave lens 201 at three different incident positions, the incident light is not refracted when passing through a center 2011 of the spherical concave lens 201, the incident light is refracted by a refraction angle $\theta_1$ when passing through the spherical concave lens 201 at a first position 2012 close to the center, and the incident light is refracted by a refraction angle $\theta_2$ when passing through the spherical concave lens 201 at a second position 2013 far away from the center, the refraction angle $\theta_2 > \theta_1$. A deflection direction of the incident light that passes through the spherical concave lens 201 may be changed by changing a distance between the center of the spherical concave lens 201 and an axis of the incident light, namely changing the eccentric distance of the lens 102 relative to the incident light, under the condition of keeping the position of the incident light unchanged. For another example, the lens 102 is the spherical convex lens 203. The incident light is transmitted through the spherical convex lens 203 at three different incident positions, the incident light is not refracted when passing through a center 2031 of the spherical convex lens 203, the incident light is refracted by a refraction angle $\theta_3$ when passing through the spherical convex lens 203 at a first position 2032 close to the center, and the incident light is refracted by a refraction angle $\theta_4$ when passing through the spherical convex lens 203 at a second position 2033 far away from the center, the refraction angle $\theta_4 > \theta_3$. A deflection direction of the incident light that passes through the spherical convex lens 203 may be changed by changing a distance between the center of the spherical convex lens 203 and the axis of the incident light under the condition of keeping the position of the incident light unchanged.

The rotation driving component 105 is configured to drive the lens 102 to rotate around the set rotation axis. The rotation axis is parallel to the optical axis of the lens 102. Alternatively, the rotation axis overlaps the axis of the incident light. With arrangement of the lens 102, the incident light incident to the lens 102 is refracted. With arrangement of the distance regulation component 104, the distance between the center of the lens 102 and the axis of the incident light is regulated, and the incident light is deflected to different extents by use of the fact that different parts between the center and outer periphery of the lens 102 have different refraction angles for the incident light. With arrangement of the rotation driving component 105, the lens 102 may rotate around the set rotation axis, and refracted light generated by the lens 102 from the incident light may form an annular movement track on the two-dimensional plane, so that movement of the refracted light, generated by the lens 102, of the incident light on the two-dimensional plane is implemented.

Figure 3:
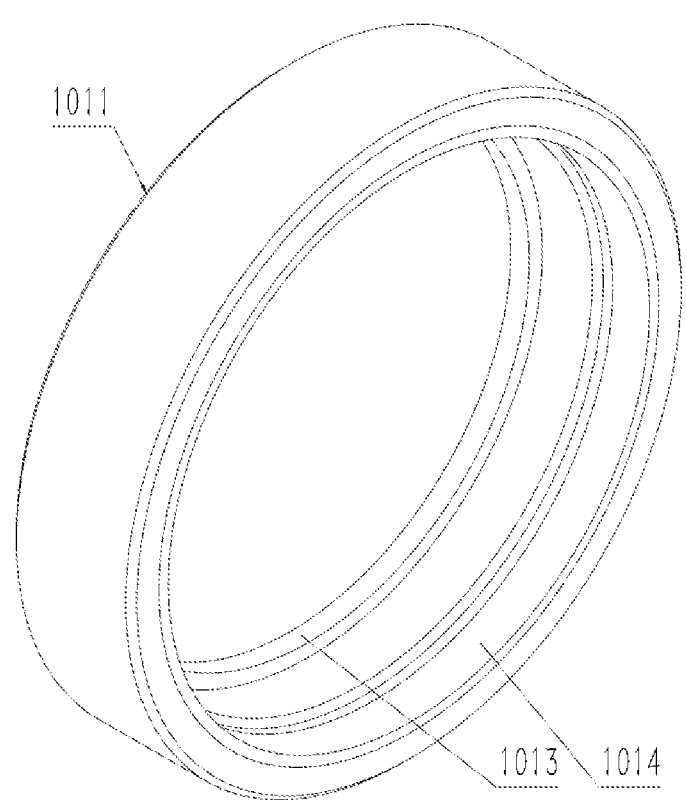
FIG. 3 is a structure diagram of a lens barrel according to an optional embodiment of the disclosure.
Figure 4:
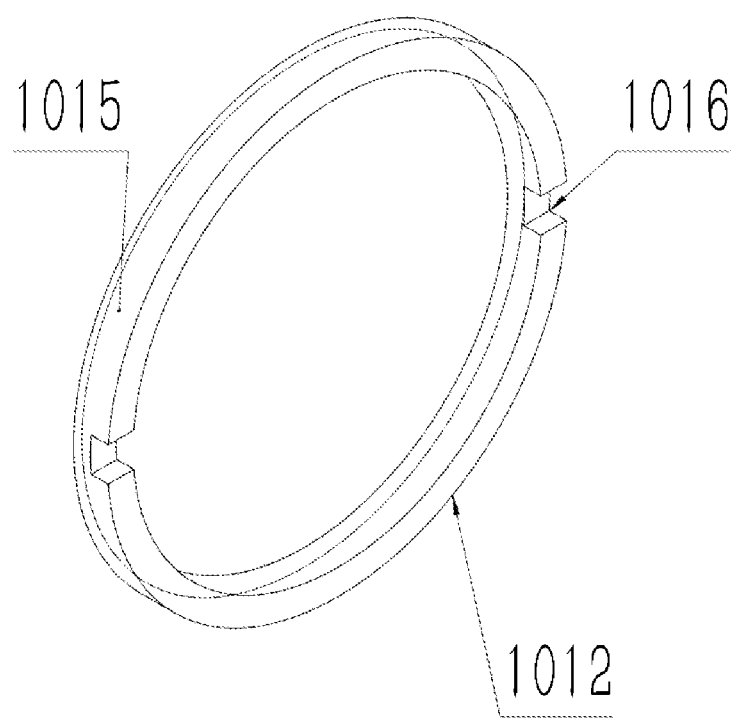
FIG. 4 is a structure diagram of a pressure ring according to an optional embodiment of the disclosure.

Here, referring to FIG. 3 and FIG. 4, the lens fixture 101 includes a lens barrel 1011 and a pressure ring 1012; an inner surface of the lens barrel 1011 is provided with a stepped surface 1013 for mounting the lens 102; and the lens 102 is mounted on the stepped surface 1013, and the pressure ring 1012 is pressed against the other side of the lens 102, which is far away from the stepped surface 1013. Specifically, the stepped surface 1013 is arranged at a central part of the inner surface of the lens barrel 1011, one side of the lens 102 is pressed against the stepped surface 1013, and the pressure ring 1012 is pressed against the other side of the lens 102, which is far away from the stepped surface 1013. Alternatively, a first thread 1014 is further arranged on the inner surface of the lens barrel 1011, and is matched with a second thread 1015 arranged on an outer surface of the pressure ring 1012. The first thread 1014 fits with the second thread 1015 to tighten the pressure ring 1012 and the lens barrel 1011 to fix the lens 102. Alternatively, referring to FIG. 4, two grooves 1016 are formed in the pressure ring 1012, and the grooves 1016 are formed symmetrically about a circle center. With formation of the grooves 1016, a tool may conveniently extend into the grooves 1016 to operate to screw the pressure ring 1012 to the inner surface of the lens barrel 1011.

Figure 5:
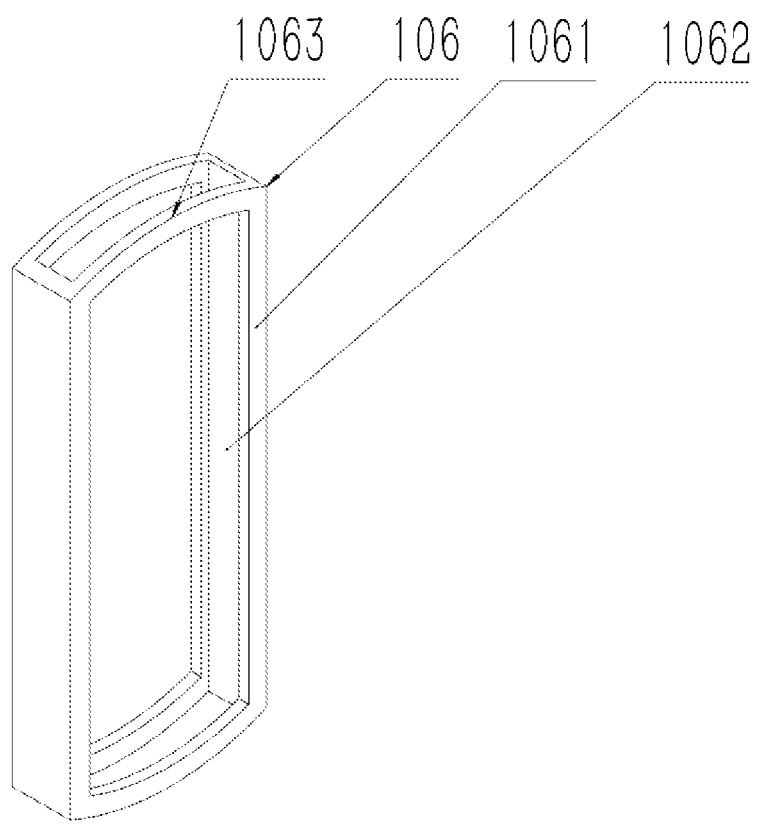
FIG. 5 is a structure diagram of a guide rail according to an optional embodiment of the disclosure.

Here, the distance regulation component 104 includes a guide structure 106. Referring to FIG. 1 and FIG. 5, the guide structure 106 includes guide rails 1061 located on two opposite sides of the lens fixture 101, guide slots 1062 for receiving the two opposite sides of the lens fixture 101 are formed in the guide rails 1061, and an extending direction of the guide slot 1062 is perpendicular to the rotation axis. Specifically, the number of the guide rails 1061 is two, they are located on the two opposite sides of the lens fixture 101 respectively, the guide slots 1062 are formed in inner lateral surfaces, facing the other guide rails 1061, of the corresponding guide rails 1061 respectively, and the extending direction of the guide slot 1062 is perpendicular to the rotation axis. Alternatively, the extending direction of the guide slot 1062 is the same as an extending direction of the guide rail 1061. A connecting cross rod 1063 is arranged between tail ends of the two guide rails 1061 to fix a distance between the two guide slots 1062. A specification of the guide slot 1062 is matched with the lens fixture 101 such that the lens fixture 101 may be correspondingly received in the guide slot 1062 and may slide in the guide slot 1062 along a direction of the guide slot 1062 to implement relative sliding connection between the lens fixture 101 and the guide slot 1062.

Figure 6:
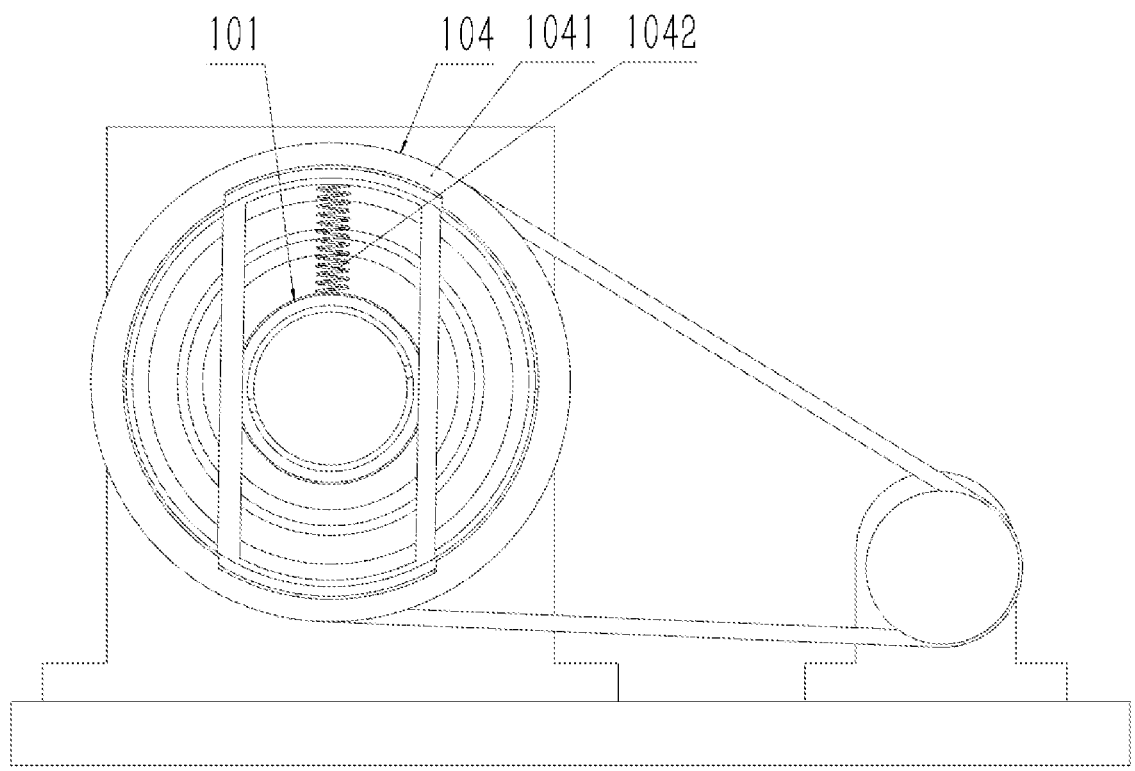
FIG. 6 is a structure diagram of a distance regulation component according to an optional embodiment of the disclosure.

Here, referring to FIG. 1 and FIG. 6, the distance regulation component 104 includes an annular bracket 1041 and a spring 1042; the spring 1042 includes a first end connected with the lens fixture 101 and a second end connected with the annular bracket 1041; and the annular bracket 1041 is connected with the rotation driving component 105. Specifically, the annular bracket 1041 is connected with the second end of the spring 1042 to fix the spring 1042 on the annular bracket 1041. The first end of the spring 1042 is connected with the lens fixture 101. Alternatively, the first end of the spring 1042 is connected with the lens barrel 1011 in the lens fixture 101. The annular bracket 1041 is connected with the rotation driving component 105 to drive the spring 1042, the lens fixture 101 and the lens 102 to rotate around the set rotation axis. Alternatively, a center of the annular bracket 1041 is located on the set rotation axis. Under the action of gravities of the lens fixture 101 and the lens 102, when the rotation driving component 105 drives the annular bracket 1041 to rotate, a deformation of the spring 1042 changes along with a change in a rotating velocity. Since the spring 1042 is deformed along a radial direction of the annular bracket 1041, the lens fixture 101 and the lens 102 move along the radial direction of the annular bracket 1041. Alternatively, if a center of mass of the lens fixture 101 and the lens 102 is located between the first end of the spring 1042 and the rotation axis when the laser scanning device 10 is in an off-working state, when the laser scanning device 10 is in a working state, namely the annular bracket 1041 is in a state of rotating around the set rotation axis, the spring 1042 generates a compressive deformation under the action of centrifugal forces generated by the lens fixture 101 and the lens 102 during rotation, the compressive deformation of the spring 1042 increases along with increase of the rotating velocity, and the lens fixture 101 and the lens 102 get far away from the rotation axis along the radial direction of the annular bracket 1041 along with the deformation of the spring 1042. Alternatively, if the rotation axis is located between the center of mass of the lens fixture 101 and the lens 102 and the first end of the spring 1042 when the laser scanning device 10 is in the off-working state, when the laser scanning device 10 is in the working state, namely the annular bracket 1041 is in the state of rotating around the set rotation axis, the spring 1042 generates an elongation deformation under the action of the centrifugal forces generated by the lens fixture 101 and the lens 102 during rotation, the elongation deformation of the spring 1042 increases along with increase of the rotating velocity, and the lens fixture 101 and the lens 102 get far away from the rotation axis along the radial direction of the annular bracket 1041 along with the deformation of the spring 1042.

Figure 7:
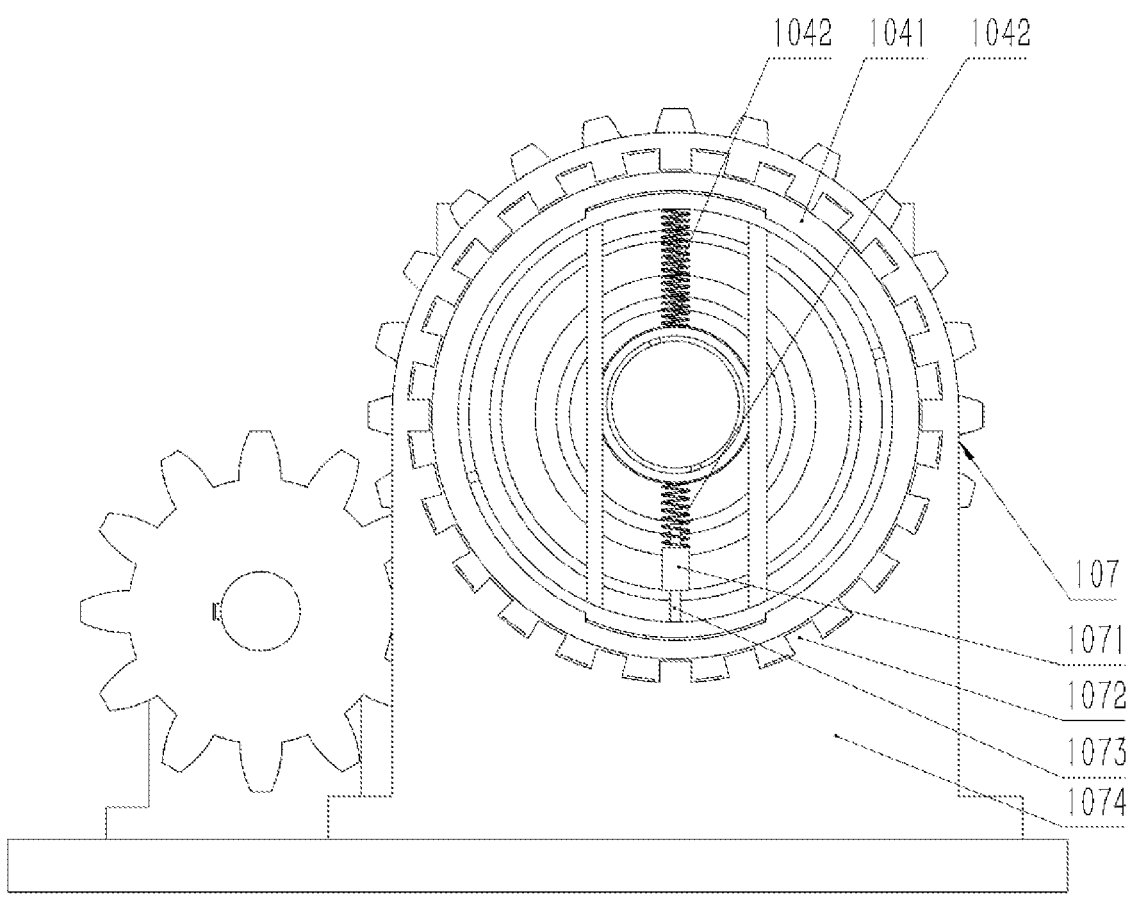
FIG. 7 is a structure diagram of a distance regulation component according to another optional embodiment of the disclosure.

Here, referring to FIG. 7, the distance regulation component 104 further includes a magnetic driving mechanism 107 driving the spring 1042 to extend and retract, and the magnetic driving mechanism 107 includes a first magnet 1071 and multiple second magnets 1072; the spring 1042 further includes a third end connected with the first magnet 1071 and a fourth end connected with the lens fixture 101; and the multiple second magnets 1072 are arranged along a circumferential direction of the annular bracket 1041. Specifically, the first magnet 1071 is connected with the third end of the spring 1042, the fourth end of the spring 1042 is connected with the lens fixture 101, the first end of the spring 1042 is connected with the lens fixture 101, the second end of the spring 1042 is connected with the annular bracket 1041, the first end, second end, third end and fourth end of the spring 1042 are located on the same straight line, and a connecting line of the second end and fourth end of the spring 1042 is parallel to a diameter of the lens 102. The multiple second magnets 1072 are arranged along the circumferential direction of the annular bracket 1041. Alternatively, the multiple second magnets 1072 are arranged at equal intervals along the circumferential direction of the annular bracket 1041. Alternatively, a limiting hole is formed in the first magnet 1071, and an extending direction of the limiting hole is parallel to an axis of the spring 1042. The magnetic driving mechanism 107 further includes a limiting column 1073, one end of the limiting column 1073 is connected to the annular bracket 1041, a diameter of the limiting column 1073 is less than a diameter of the limiting hole, and the other end of the limiting column 1073 penetrates through the limiting hole to be connected with the first magnet 1071. Alternatively, the magnetic driving mechanism 107 further includes a support structure 1074. The multiple second magnets 1072 are arranged on the support structure 1074, so that position fixation of the second magnets 1072 is ensured. Alternatively, the first magnet 1071 is a permanent magnet, and the second magnet 1072 is an electromagnet. A magnitude of a current on the second electromagnet 1072 may be changed to regulate a magnitude of magnetism of the second magnet 1072 to control a distance between the second magnet 1072 and the first magnet 1071, so that the position of the lens fixture may be correspondingly regulated to correspondingly regulate the eccentric distance of the lens relative to the incident light. Like magnetic poles of the first magnet 1071 and the second magnet 1072 are opposite, namely an N pole of the first magnet 1071 is opposite to an N pole of the second magnet 1072 or an S pole of the first magnet 1071 is opposite to an S pole of the second magnet 1072. Along with increase of the magnetism of the second magnet 1072, the distance between the first magnet 1071 and the second magnet 1072 is prolonged, and the eccentric distance of the lens 102 relative to the incident light is further changed. Alternatively, dislike magnetic poles of the first magnet 1071 and the second magnet 1072 are opposite, namely the N pole of the first magnet 1071 is opposite to the S pole of the second magnet 1072 or the S pole of the first magnet 1071 is opposite to the N pole of the second magnet 1071. Along with increase of the magnetism of the second magnet 1072, the distance between the first magnet 1071 and the second magnet 1072 is shortened, and the eccentric distance of the lens 102 relative to the incident light may also be further changed.

Figure 8:
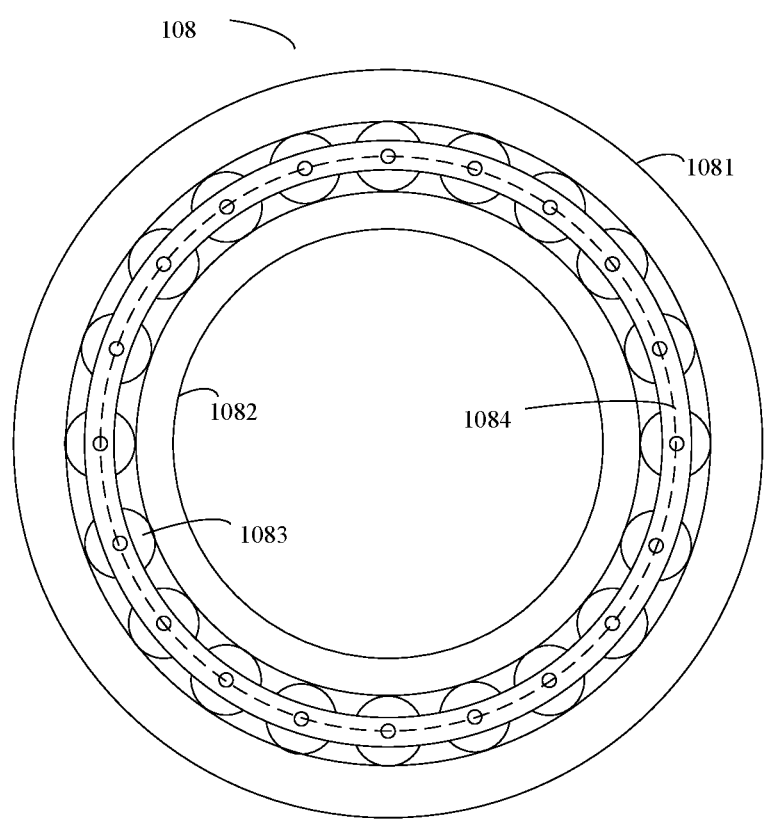
FIG. 8 is a structure diagram of a bearing according to an optional embodiment of the disclosure.

Here, referring to FIG. 1 again, the rotation driving component 105 includes a bearing 108, the bearing 108 includes an outer race 1081 and an inner race 1082 spaced from and concentric with the outer race, and the outer race 1081 is rotatable relative to the inner race 1082; and the outer race 1081 is connected with the lens fixture 101, and the outer race 1081 rotates to drive the lens fixture 101 and the lens 102 to rotate around the set rotation axis together. Specifically, referring to FIG. 8, the outer race 1081 is spaced from and concentric with the inner race 1082. The bearing 108 further includes rolling bodies 1083 arranged between the outer race 1081 and the inner race 1082 and a holder 1084 supporting every two rolling bodies 1083 to be spaced, and the outer race 1081 is rotatable relative to the outer race 1082. The outer race 1081 is connected with the lens fixture 101, and the outer race 1081 rotates to drive the lens fixture 101 and the lens 102 to rotate around the set rotation axis. Alternatively, the outer race 1081 is connected with the annular bracket 1041, and the lens fixture 101 is connected with the annular bracket 1041. As another optional embodiment, the outer race 1081 may directly serve as the annular bracket 1041.

Figure 9:
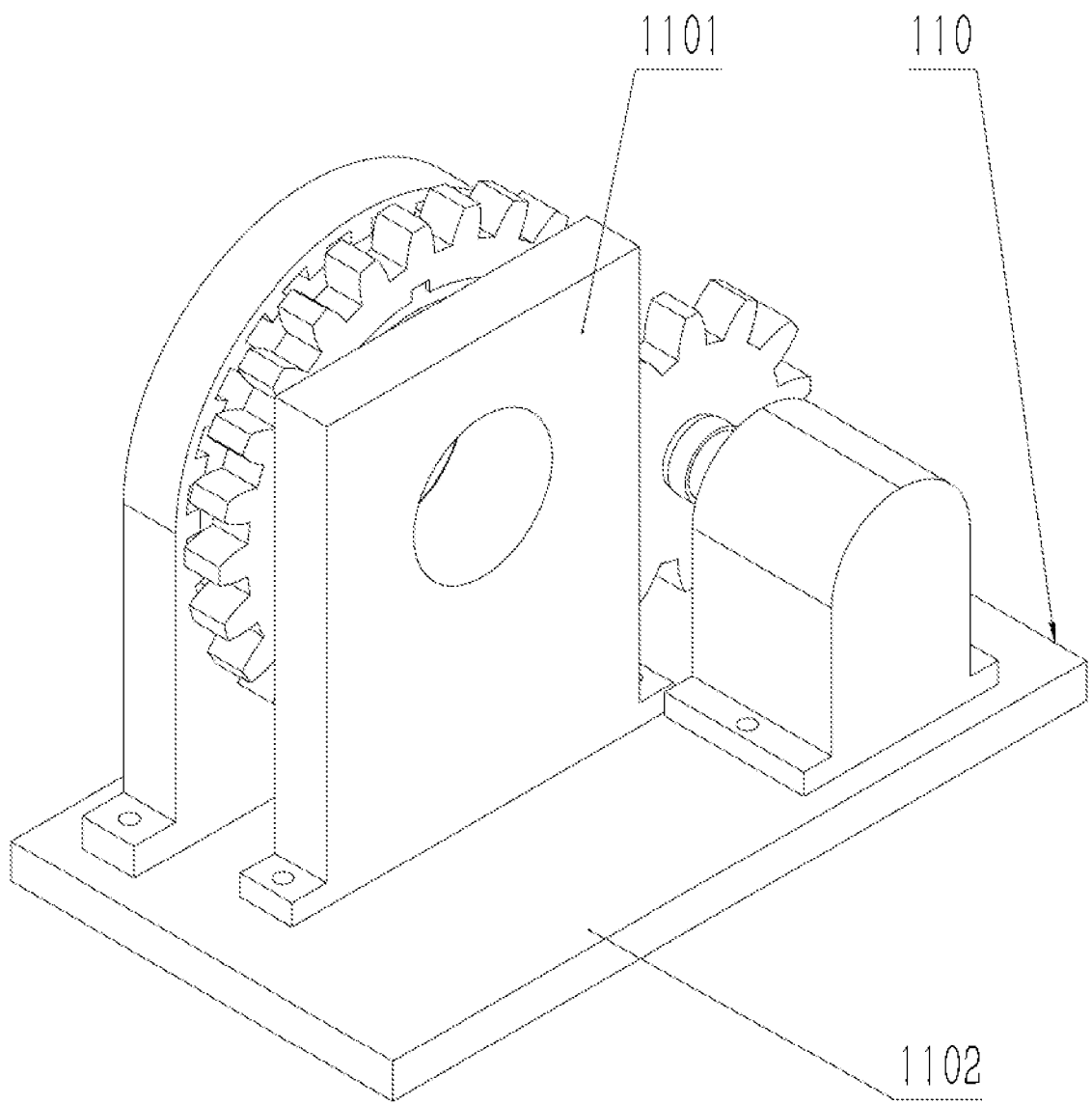
FIG. 9 is a structure diagram of a fixed seat according to an optional embodiment of the disclosure.

Here, referring to FIG. 9, the laser scanning device further includes a fixed seat 110 fixedly connected with the inner race 1082, and the fixed seat 110 is configured to fix the bearing 108. Specifically, the fixed seat 110 includes a main fixed seat 1101 and an auxiliary fixed seat 1102, the main fixed seat 1101 is fixedly connected with the inner race 1082, and is configured to fix the bearing 108, and the auxiliary fixed seat 1102 is fixedly connected with the main fixed seat 1101, and is configured to bear the main fixed seat 1101. With arrangement of the fixed seat 110, a position of the bearing 108 is fixed, and the rotation axis that the lens fixture 101 and the lens 102 rotate around is further fixed.

Here, referring to FIG. 1 again, the rotation driving component 105 further includes a gear driving structure 109 connected with the outer race 1081, and the gear driving structure 109 includes a driven gear 1091, a driving gear 1092 and a motor 1093; and the driven gear 1091 is fixedly connected with the outer race 1081, the driving gear 1092 is connected with the motor 1093, the driving gear 1092 is meshed with the driven gear 1091, and the motor 1093 drives the driving gear 1092 to rotate and drives the driven gear 1091 to rotate to further drive the lens fixture 101 and the lens 102 to rotate around the rotation axis together. Specifically, the gear driving structure 109 is connected with the outer race 1081, teeth are arranged on outer surfaces of both the driven gear 1091 and the driving gear 1092, the number of the teeth is at least three, they are uniformly distributed on the outer surfaces of the driven gear 1091 and the driving gear 1092, and the driving gear 1092 is meshed with the driven gear 1091. Alternatively, the driven gear 1091 is fixedly connected with the outer race 1081, and the driving gear 1092 is fixedly connected with the motor 1093, the motor 1093 drives the driving gear 1092 to rotate to indirectly drive the driven gear 1091 to rotate to further drive the lens fixture 101 and the lens 102 to rotate around the rotation axis together. Alternatively, the motor 1093 is fixed on the fixed seat 110.

Figure 10:
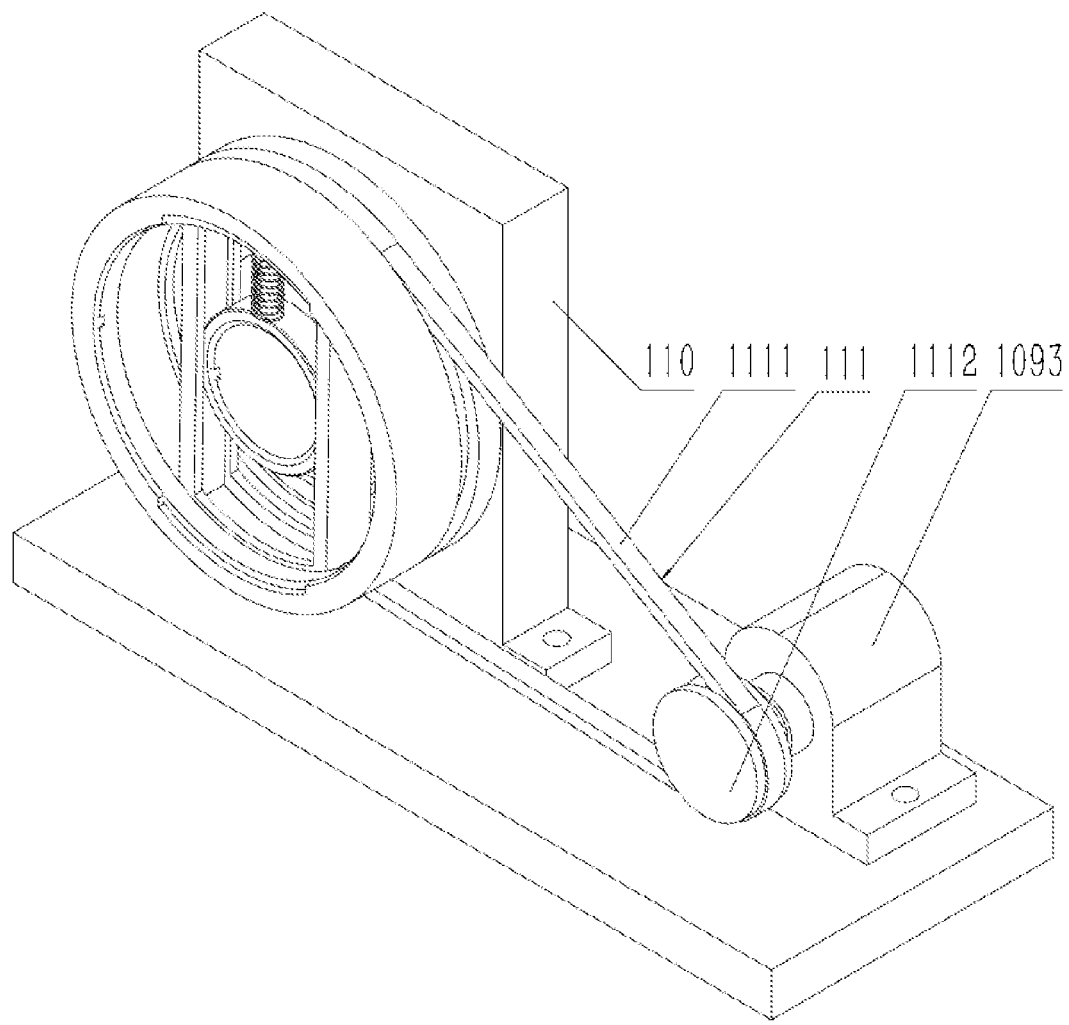
FIG. 10 is a structure diagram of a rotation driving component according to an optional embodiment of the disclosure.
Figure 11:
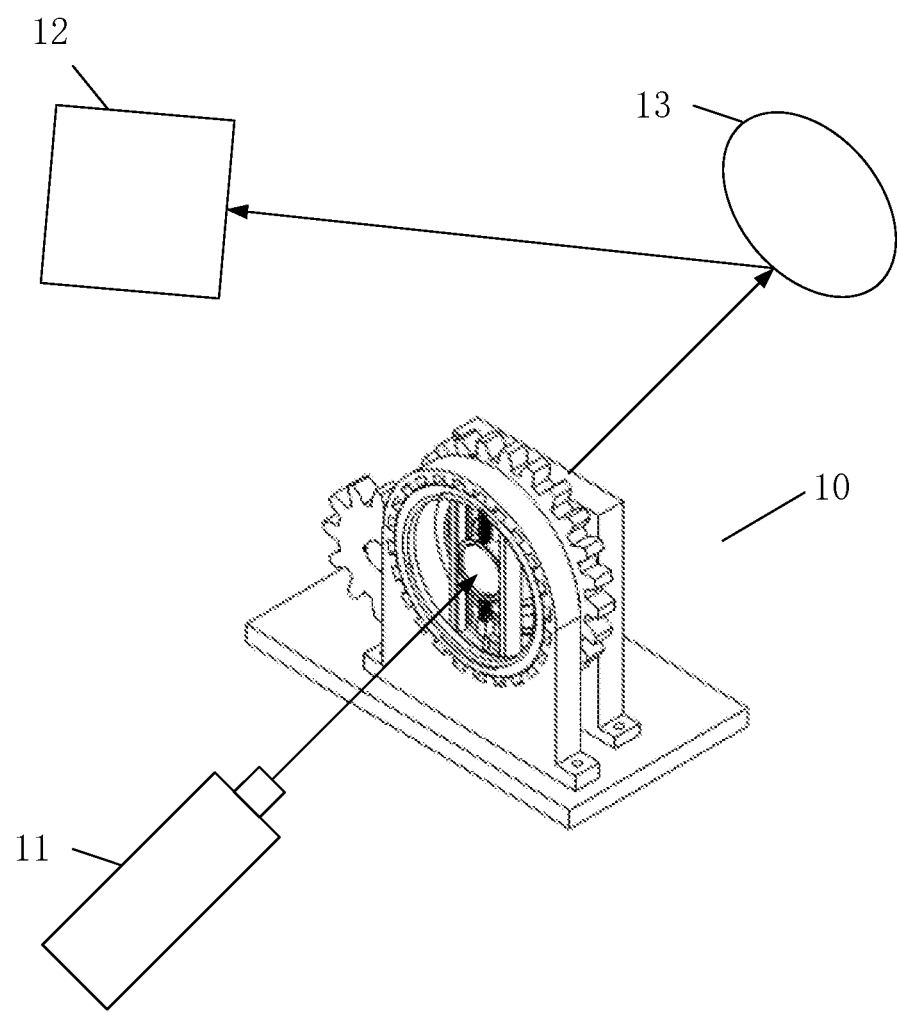
FIG. 11 is a composition schematic diagram of a laser radar according to an optional embodiment of the disclosure.

Here, as another optional embodiment, referring to FIG. 10, the rotation driving component 105 further includes a drive belt driving structure 111, and the drive belt driving structure 111 includes a drive belt 1111, a driving pulley 1112 and a motor 1093. The drive belt 1111 is sleeved on the outer race 1081 and the driving pulley 1112, and the motor 1093 drives the driving pulley 1112 to rotate to further drive the lens fixture 101 and the lens 102 to rotate around the rotation axis. Specifically, grooves matched with the drive belt 1111 are formed in both the outer race 1081 and the driving pulley 1112, the grooves surround an outer surface of the outer race 1081 and an outer surface of the driving pulley 1112 respectively, the drive belt 1111 is connected into the grooves in the outer race 1081 and the driving pulley 1112 in a sleeving manner, the motor 1093 is connected with the driving pulley 1112, and the motor 1093 drives the driving pulley 1112 to rotate to further drive the lens fixture 101 and the lens 102 to rotate around the rotation axis. Alternatively, the motor 1093 is fixed on the fixed seat 110.

Another aspect of the embodiments of the disclosure also provides a laser radar, which includes a laser 11, a photoelectric detector 12 and a laser scanning device 10. The laser 11 is arranged on one side of the laser scanning device 10, and is configured to emit a laser beam incident to a lens 102. The laser scanning device 10 is configured to refract the laser beam, the refracted laser beam being emergent to a target 13. The photoelectric detector 12 is configured to acquire a laser beam reflected by the target 13. The laser scanning device 10 is the laser scanning device 10 provided in any embodiment of the disclosure, and includes a lens fixture 101, the lens 102 and a light path regulation mechanism 103. The lens 102 is arranged on the lens fixture 101, and one side of the lens 102 faces the laser beam. The light path regulation mechanism 103 is connected with the lens fixture 101 and includes a distance regulation component 104 and a rotation driving component 105, the distance regulation component 104 is configured to regulate a position of the lens fixture 101, the distance regulation component 104 regulates the position of the lens fixture 101 to correspondingly regulate an eccentric distance of the lens 102 relative to the laser beam, the rotation driving component 105 is configured to drive the lens 102 to rotate around a set rotation axis that is parallel to an optical axis of the lens 102.

With arrangement of the lens 102, the laser beam incident to the lens 102 is refracted. With arrangement of the distance regulation component 104, a distance between a center of the lens 102 and an axis of the laser beam is regulated, and the laser beam is deflected to different extents by use of the fact that different parts between the center and outer periphery of the lens 102 have different refraction angles for the incident light. With arrangement of the rotation driving component 105, the lens 102 may rotate around the set rotation axis, and refracted light generated by the lens 102 from the laser beam may form an annular movement track at the target 13. Therefore, under the action of refracting incident light to different extents at different parts between the center and outer periphery of the lens 102, movement of the refracted light generated by the lens 102 from the laser beam in a two-dimensional plane may be implemented only by single rotational movement of the lens 102, the whole structure is more compact, and the size of the laser scanning device 10 is reduced. According to the laser radar, the laser 11 emits the laser beam to the lens 102 in the laser scanning device 10, the laser scanning device 10 implements movement of the refracted light generated by the lens 102 from the laser beam in the two-dimensional plane through the light path regulation mechanism 103 to ensure that the laser beam may be reflected to a position of the photoelectric detector 12 after being incident to a complete surface of the target 13, and the photoelectric detector 12 is arranged to acquire the laser beam reflected by the target 13 to implement acquisition of information about the target 13 and complete scanning the target 13.

The above is only the preferred embodiment of the disclosure and not intended to limit the scope of protection of the disclosure.

INDUSTRIAL APPLICABILITY

In the embodiments of the disclosure, the laser scanning device includes the lens fixture, the lens and the light path regulation mechanism. The lens is arranged on the lens fixture, and one side of the lens faces the incident light. The light path regulation mechanism is connected with the lens fixture and includes the distance regulation component and the rotation driving component, the distance regulation component is configured to regulate the position of the lens fixture, the distance regulation component regulates the position of the lens fixture to correspondingly regulate the eccentric distance of the lens relative to the incident light, the rotation driving component is configured to drive the lens to rotate around the set rotation axis that is parallel to the optical axis of the lens. With arrangement of the lens, the incident light incident to the lens is refracted. With arrangement of the distance regulation component, the distance between the center of the lens and the axis of the incident light is regulated, and the incident light is deflected to different extents by use of the fact that different parts between the center and outer periphery of the lens have different refraction angles for the incident light. With arrangement of the rotation driving component, the lens may rotate around the set rotation axis, and refracted light generated by the lens from the incident light may form the annular movement track on the two-dimensional plane. Therefore, under the action of refracting the incident light to different extents at different parts between the center and outer periphery of the lens, movement of the refracted light generated by the lens from the incident light on the two-dimensional plane may be implemented only by single rotational movement of the lens, the whole structure is more compact, and the size of the scanning device is reduced. According to the laser radar in the embodiments of the disclosure, the laser emits the laser beam to the lens in the laser scanning device, the laser scanning device implements movement of the refracted light generated by the lens from the laser beam in the two-dimensional plane through the light path regulation mechanism to ensure that the laser beam may be reflected to the position of the photoelectric detector after being incident to the complete surface of the target, and the photoelectric detector is arranged to acquire the laser beam reflected by the target to implement acquisition of the information about the target and complete scanning the target.

The invention claimed is:

1. A laser scanning device, comprising a lens fixture, a lens and a light path regulation mechanism,
   wherein the lens is arranged on the lens fixture, and one side of the lens faces incident light; and
   wherein the light path regulation mechanism is connected with the lens fixture and comprises a distance regulation component and a rotation driving component, wherein the distance regulation component is configured to regulate a position of the lens fixture, the distance regulation component regulates the position of the lens fixture to correspondingly regulate an eccentric distance of the lens relative to the incident light, and the rotation driving component is configured to drive the lens to rotate around a set rotation axis that is parallel to an optical axis of the lens,
   wherein the distance regulation component comprises a guide structure that comprises guide rails located on two opposite sides of the lens fixture, wherein guide slots for receiving the two opposite sides of the lens fixture are formed in the guide rails to enable an entirety of the lens fixture to be enclosed within a space defined by the guide rails and connecting cross rods of the guide structure, and an extending direction of the guide slots is perpendicular to the rotation axis, each of the connecting cross rod being arranged between respective tail ends of the two guide rails.

2. The laser scanning device of claim 1, wherein the lens fixture comprises a lens barrel and a pressure ring;
an inner surface of the lens barrel is provided with a stepped surface for mounting the lens; and
the lens is mounted on the stepped surface, and the pressure ring is pressed against the other side of the lens, the other side being far away from the stepped surface.

3. The laser scanning device of claim 1, wherein the distance regulation component comprises an annular bracket and a spring;
the spring comprises a first end connected with the lens fixture and a second end connected with the annular bracket; and
the annular bracket is connected with the rotation driving component.

4. The laser scanning device of claim 3, wherein the distance regulation component further comprises a magnetic driving mechanism driving the spring to extend and retract, and the magnetic driving mechanism comprises a first magnet and a plurality of second magnets;
the spring further comprises a third end connected with the first magnet and a fourth end connected with the lens fixture; and
the multiple second magnets are arranged along a circumferential direction of the annular bracket.

5. The laser scanning device of claim 1, wherein the rotation driving component comprises a bearing, the bearing comprising an outer race and an inner race spaced from and concentric with the outer race, and the outer race being rotatable relative to the inner race; and the outer race is connected with the lens fixture, and the outer race rotates to drive the lens fixture and the lens to rotate around the set rotation axis together.

6. The laser scanning device of claim 5, wherein the rotation driving component further comprises a gear driving structure connected with the outer race, and the gear driving structure comprises a driven gear, a driving gear and a motor,
wherein the driven gear is fixedly connected with the outer race, the driving gear is connected with the motor, the driving gear is meshed with the driven gear, and the motor drives the driving gear to rotate and drives the driven gear to rotate to further drive the lens fixture and the lens to rotate around the rotation axis together.

7. The laser scanning device of claim 5, wherein the rotation driving component further comprises a drive belt driving structure, and the drive belt driving structure comprises a drive belt, a driving pulley and a motor,
wherein the drive belt is sleeved on the outer race and the driving pulley, and the motor drives the driving pulley to rotate to further drive the lens fixture and the lens to rotate around the rotation axis.

8. The laser scanning device of claim 5, further comprising a fixed seat fixedly connected with the inner race, wherein the fixed seat is configured to fix the bearing.

9. A laser radar, comprising a laser, a photoelectric detector and a laser scanning device comprising a lens fixture, a lens and a light path regulation mechanism,
wherein the lens is arranged on the lens fixture, and one side of the lens faces incident light;
wherein the light path regulation mechanism is connected with the lens fixture and comprises a distance regulation component and a rotation driving component, wherein the distance regulation component is configured to regulate a position of the lens fixture, the distance regulation component regulates the position of the lens fixture to correspondingly regulate an eccentric distance of the lens relative to the incident light, and the rotation driving component is configured to drive the lens to rotate around a set rotation axis that is parallel to an optical axis of the lens;
wherein the laser is arranged on one side of the laser scanning device, and is configured to emit a laser beam incident to the lens;
the laser scanning device is configured to refract the laser beam, the refracted laser beam being emergent to a target; and
the photoelectric detector is configured to acquire a laser beam reflected by the target,
wherein the distance regulation component comprises a guide structure that comprises guide rails located on two opposite sides of the lens fixture, wherein guide slots for receiving the two opposite sides of the lens fixture are formed in the guide rails to enable an entirety of the lens fixture to be enclosed within a space defined by the guide rails and connecting cross rods of the guide structure, and an extending direction of the guide slots is perpendicular to the rotation axis, each of the connecting cross rod being arranged between respective tail ends of the two guide rails.

10. The laser radar of claim 9, wherein the lens fixture comprises a lens barrel and a pressure ring;
an inner surface of the lens barrel is provided with a stepped surface for mounting the lens; and
the lens is mounted on the stepped surface, and the pressure ring is pressed against the other side of the lens, the other side being far away from the stepped surface.

11. The laser radar of claim 9, wherein the distance regulation component comprises an annular bracket and a spring;
the spring comprises a first end connected with the lens fixture and a second end connected with the annular bracket; and
the annular bracket is connected with the rotation driving component.

12. The laser radar of claim 11, wherein the distance regulation component further comprises a magnetic driving mechanism driving the spring to extend and retract, and the magnetic driving mechanism comprises a first magnet and a plurality of second magnets;
the spring further comprises a third end connected with the first magnet and a fourth end connected with the lens fixture; and
the multiple second magnets are arranged along a circumferential direction of the annular bracket.

13. The laser radar of claim 9, wherein the rotation driving component comprises a bearing, the bearing comprising an outer race and an inner race spaced from and concentric with the outer race, and the outer race being rotatable relative to the inner race; and the outer race is connected with the lens fixture, and the outer race rotates to drive the lens fixture and the lens to rotate around the set rotation axis together.

14. The laser radar of claim 13, wherein the rotation driving component further comprises a gear driving structure connected with the outer race, and the gear driving structure comprises a driven gear, a driving gear and a motor,
wherein the driven gear is fixedly connected with the outer race, the driving gear is connected with the motor, the driving gear is meshed with the driven gear, and the motor drives the driving gear to rotate and drives the driven gear to rotate to further drive the lens fixture and the lens to rotate around the rotation axis together.

15. The laser radar of claim 13, wherein the rotation driving component further comprises a drive belt driving structure, and the drive belt driving structure comprises a drive belt, a driving pulley and a motor, wherein the drive belt is sleeved on the outer race and the driving pulley, and the motor drives the driving pulley to rotate to further drive the lens fixture and the lens to rotate around the rotation axis.

16. The laser radar of claim 13, wherein the laser scanning device further comprises a fixed seat fixedly connected with the inner race, wherein the fixed seat is configured to fix the bearing.

* * * * *